US011971687B2

(12) United States Patent
Bachmann et al.

(10) Patent No.: US 11,971,687 B2
(45) Date of Patent: Apr. 30, 2024

(54) MECHANICAL HOROLOGICAL MOVEMENT WITH POWER RESERVE DETECTION

(71) Applicant: ETA SA MANUFACTURE HORLOGÈRE SUISSE, Grenchen (CH)

(72) Inventors: Stephane Bachmann, Büren an der Aare (CH); Julien Saglini, Bienne (CH); Laurent Klinger, Bienne (CH); Baptist Wyssbrod, Nidau (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 167 days.

(21) Appl. No.: 17/381,425

(22) Filed: Jul. 21, 2021

(65) Prior Publication Data

US 2022/0137558 A1 May 5, 2022

(30) Foreign Application Priority Data

Oct. 30, 2020 (EP) .................................... 20204874

(51) Int. Cl.
*G04B 9/00* (2006.01)
*G04B 1/12* (2006.01)
*G04B 9/02* (2006.01)

(52) U.S. Cl.
CPC ............... *G04B 9/005* (2013.01); *G04B 1/12* (2013.01); *G04B 9/02* (2013.01)

(58) Field of Classification Search
None
See application file for complete search history.

(56) References Cited

U.S. PATENT DOCUMENTS

2018/0095422 A1* 4/2018 Saglini ..................... G04B 9/00

FOREIGN PATENT DOCUMENTS

| | | |
|---|---|---|
| CH | 713 036 A2 | 4/2018 |
| EP | 3 306 415 A1 | 4/2018 |
| EP | 3 333 637 A1 | 6/2018 |

OTHER PUBLICATIONS

European Search Report for corresponding EP 20 20 4874 dated Apr. 8, 2021.

* cited by examiner

*Primary Examiner* — Renee S Luebke
*Assistant Examiner* — Matthew Hwang
(74) *Attorney, Agent, or Firm* — Sughrue Mion, PLLC

(57) ABSTRACT

A mechanical horological movement (1) including at least one barrel system (2) for driving a set of wheels and power reserve detector. The detector (10) includes a control wheel (3) disposed opposite the cage of the barrel system (2) and is rotated by a complementary wheel (8) at the differential output to determine a power reserve level. An aperture (13) has a first end (21) to define a complete charge of the barrel system and a second end (22) to define a complete discharge. A lever (4) is rotatably mounted about a lever axis parallel to the axis of rotation of the control wheel. A contact element (5) disposed in the aperture contacts the second end during a zero power reserve indication. A portion of the lever contacts a component of the movement to stop its operation when power reserve indication is at zero.

11 Claims, 6 Drawing Sheets

MECHANICAL HOROLOGICAL MOVEMENT WITH POWER RESERVE DETECTION

CROSS REFERENCE TO RELATED APPLICATIONS

This application claims priority to European Patent Application No. 20204874.0 filed Oct. 30, 2020, the entire contents of which are incorporated herein by reference.

TECHNICAL FIELD

The present invention relates to a mechanical horological movement provided with power reserve detection means.

TECHNOLOGICAL BACKGROUND

A power reserve of a mechanical horological movement of a mechanical watch enables a person wearing the watch to display the operating time before the horological movement stops. It has been observed that the power reserve from one watch to another can vary significantly depending mainly on the manufacturing tolerances of the watch, wear, lubrication, roughness.

In a conventional mechanical horological movement, it can be seen that the horological movement still works even after the power reserve indicator already shows zero. It is a disadvantage that the watch still works even when the power reserve indication is at zero. Thus, the instant when the watch stops is not synchronous with the instant when the hand points to zero.

A mechanical horological movement generally comprises a barrel system driving at least one wheel at the charge outlet and one wheel at the discharge outlet connected respectively to a charge wheel and to a discharge wheel of a differential. A set of wheels connected to an intermediate wheel of the differential controls a power reserve display, but no movement element is provided for an operation of blocking the movement when the power reserve is at zero.

Patent EP 0 568 499 B1 describes a power reserve indicator device for a mechanical watch. The indicator device comprises at least one star wheel with an indicator member, which is rotated during the charging or discharging of the barrel. The indicator member is used to display the power reserve of the watch. However, nothing is planned to ensure that the movement is blocked when the power reserve approaches zero.

Patent CH 698 752 B1 describes a timepiece, which comprises a power reserve indication mechanism. It comprises two barrels facing each other and connected by a common shaft, which controls the power reserve display mechanism. However, nothing is planned to ensure that the movement is blocked when the power reserve approaches zero.

Patent application CH 710 320 A2 describes a timepiece, which comprises a source of mechanical energy, such as a barrel and a control member in connection with a control device in the watch case. The control device includes a power reserve wheel mounted to pivot on the frame and connected to the barrel by a differential so that the angular position of the power reserve wheel depends on the charge level of the barrel. A control cam is pivotally mounted on the same axis as the power reserve wheel. The control cam has an opening extending in an arc of a circle wherein is housed a peg integral with the power reserve wheel. A spiral spring is mounted between the power reserve wheel and the cam. In connection with the control device, provision is also made of a stop device, which comprises a stop lever, to block the movement when the power reserve is close to zero.

SUMMARY OF THE INVENTION

The main purpose of the invention is therefore to overcome the disadvantages of the prior art by proposing a mechanical horological movement provided with power reserve detection means and capable of directly blocking the operation of the movement, when the power reserve is close to or equal to zero, using a minimum of components to achieve a compact system.

To this end, the present invention relates to a mechanical horological movement provided with power reserve detection means, which comprises the features of independent claim 1.

Particular embodiments of the mechanical horological movement are defined in dependent claims 2-11.

An advantage of the mechanical horological movement with the power reserve detection means lies in the fact that an increase in the precision of the power reserve indication is achieved. This means that the power reserve detection means are made in such a way that the power reserve indication at zero corresponds to the actual stopping of the mechanical movement of the watch.

Advantageously, a control element, which may be a wheel or a plate, is preferably connected directly to a wheel of a drive wheel arrangement at the output of the differential to be driven in rotation or in a rectilinear direction. Depending on the position of the control element, once the power reserve indication is at zero, the horological movement is directly blocked via the barrel system, or even the mechanical oscillator having a balance spring in an extreme case.

Advantageously, the power reserve detection means preferably comprise a control wheel and a lever rotatably mounted about a lever axis and cooperating with the control wheel so as to determine on the one hand that the barrel is completely charged, and on the other hand that the barrel is practically completely discharged for the indication of the power reserve at zero. The control wheel comprises a circular-arc shaped aperture with a determined angle and centred on the axis of the wheel, and the control lever comprises a contact element, such as a rod or a pin or a blade inserted into the aperture of the control wheel. The axis of the wheel is disposed parallel to the central axis of the barrel system.

Advantageously, the aperture of the control wheel comprises a first end to determine a 100% power reserve of the barrel and a second end to determine a 0% power reserve of the barrel system. The first and second ends have circular portions. Preferably, the circular portions at the ends define half of a circle with a radius corresponding to half the width of the aperture. The power reserve is at 100%, that is to say that the barrel system is completely charged, when the rod or the pin, or when a complementary rod or complementary pin which can be the central axis of the barrel system between the rod or pin of the lever and the first end, contacts the first end. The power reserve is at zero when the rod or the pin or the blade of the lever contacts the second end. In this case, the lever pivots around its axis of rotation in such a way as to allow a blocking part of the lever to block any element of the movement causing the movement to stop completely and instantly.

In a first embodiment, the lever comprises a blocking part at one end of the lever frictionally contacting a peripheral edge of the cage of the barrel system to block the horological movement. The blocking part is at an end opposite to that of the contact element, which is the rod or pin inserted into the aperture of the wheel. The axis of rotation of the lever is near the blocking part and disposed in such a way that in the blocked position, the rotation of the lever brings the blocking part against the peripheral edge of the barrel system.

In a second embodiment, the lever comprises a blocking part in the shape of a tooth at one end of the lever to be inserted between two teeth of a toothed wheel on the periphery of the barrel system. As before, the blocking part is at an end opposite to that of the rod or the pin inserted into the aperture of the wheel. The axis of rotation of the lever is near the rod where the pin of the lever is disposed so that in the blocked position, the rotation of the lever brings the tooth into the peripheral teeth of the barrel system.

In a third embodiment, the lever comprises a blocking part at a remote end of the lever to contact a rim of a spiral balance as a mechanical oscillator. The axis of rotation of the lever is at an end opposite to the blocking part, while the rod or pin inserted into the aperture of the wheel is in an intermediate position, but close to the axis of rotation of the lever.

Advantageously, the power reserve detection means may comprise a control element in the shape of a plate, which comprises a rectilinear aperture with a first end and a second end, and a control lever rotatably mounted with a rod or a pin at an end of the lever, and inserted into the rectilinear aperture. The control element can be moved rectilinearly between guide portions by means of a toothed wheel at the output of the barrel meshing with a toothed rectilinear portion on one side of the control element. When the rod or the pin of the lever in particular contacts the second end of the rectilinear aperture, there is a blocking of the horological movement by the blocking part of the lever in direct contact with the rim of the spiral balance with an indication of the power reserve at zero.

BRIEF DESCRIPTION OF THE FIGURES

The purposes, advantages and features of a mechanical horological movement provided with power reserve detection means will appear better in the following description in a non-limiting manner with regard to the drawings wherein.

DETAILED DESCRIPTION OF THE INVENTION

In the following description, all the components of a mechanical horological movement provided with power reserve detection means, which are well known to a person skilled in the art in this technical field, are only described in a simplified manner.

Figure 1A:
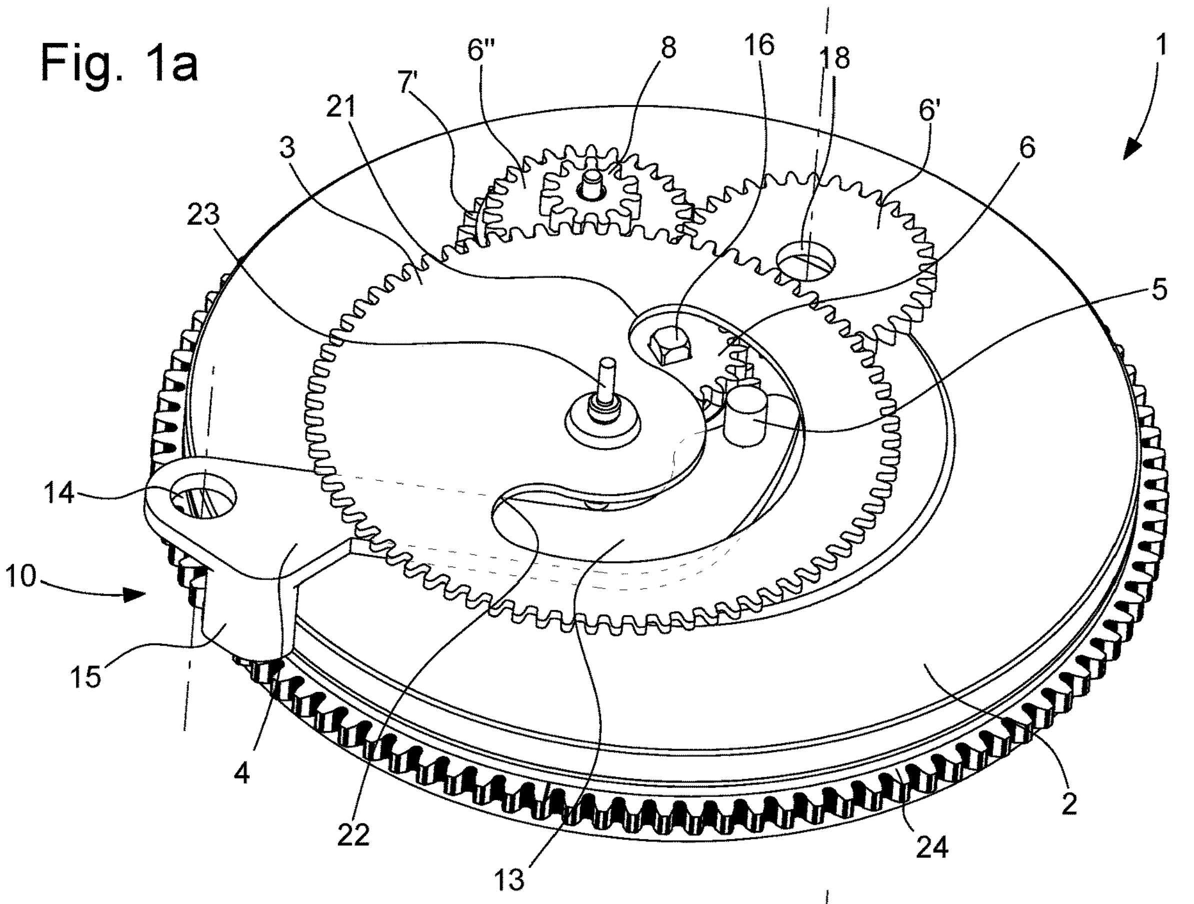
FIGS. 1*a*, 1*b* and 1*c* show two three-dimensional top views and a top view of the position shown in FIG. 1*b* of a first simplified embodiment of the mechanical horological movement provided with power reserve detection means according to the invention.
Figure 1B:
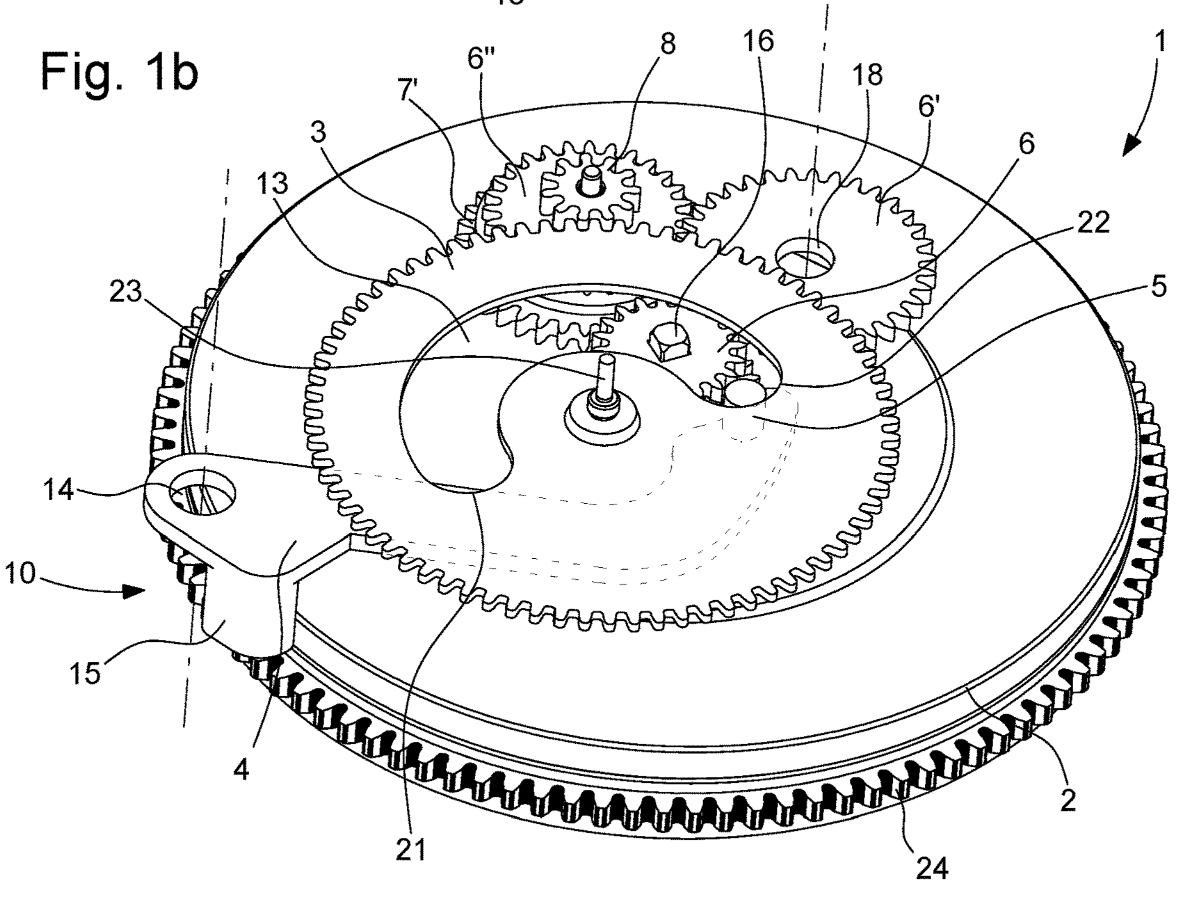
Figure 1C:
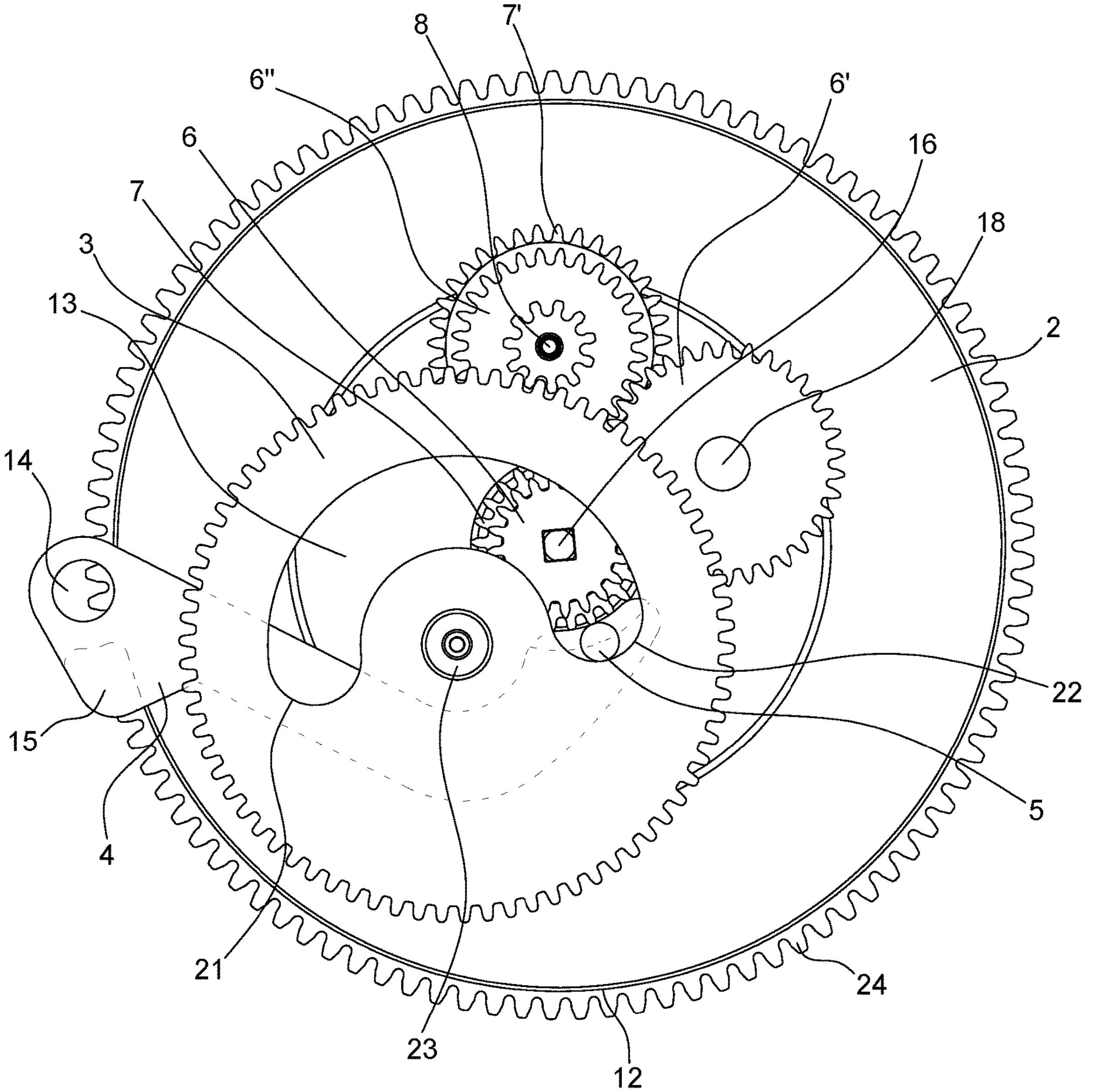

FIGS. 1*a*, 1*b* and 1*c* show three-dimensional top views of some components of the mechanical horological movement 1 with the power reserve detection means 10, as well as a top plan view in the position of the power reserve means illustrated in FIG. 1*b* of a first embodiment. The mechanical horological movement 1 for a watch is in the normal operating position in FIG. 1*a* and in the movement blocking position in FIG. 1*b* with zero power reserve, as well as in FIG. 1*c*.

The mechanical horological movement 1 comprises at least the barrel system 2, which is disposed for example on one face of a watch platen of the movement (not shown) or of another support plate. This barrel system 2 can be with a single barrel or two barrels or more than two well-known barrels and having a charge output and a discharge output, as well as a differential to drive a time base geartrain. In the case shown in FIGS. 1*a*, 1*b* and 1*c*, a differential barrel system 2 with a toothed wheel 24 peripheral to the cage of the barrel system 2 can be used to drive at least one large middle finishing geartrain and/or a drive geartrain starting from the axis or shaft 16 of the barrel system 2.

In general, provision is made of at least one drive wheel connected to the central axis or shaft 16 of the barrel system 2. Preferably, as shown in FIGS. 1*a*, 1*b* and 1*c*, there is at least one first arrangement of the drive wheels 7, 7', a base wheel 7 of which is fixed either on the cage of the barrel system 2 to rotate with the cage, or connected to the central axis or shaft 16 of the barrel system 2. Normally, the cage of the barrel system 2 rotates in the same direction as the central axis or shaft 16 of the barrel system 2.

Preferably according to the first embodiment, provision is made of the first drive wheel 7, 7' arrangement and also of a second drive wheel 6, 6', 6" arrangement as use is made of a differential barrel system 2. The first drive wheel 7, 7' arrangement is connected to a differential discharge input, while the second drive wheel 6, 6', 6" arrangement is connected to a differential charge input. In this first embodiment, the first drive wheel 7, 7' arrangement comprises a first base wheel 7 fixed on the cage of the barrel system 2, while the second drive wheel 6, 6', 6" arrangement comprises a first base wheel 6 connected directly to the axis or to the central shaft 16 of the barrel system 2.

The means 10 for detecting the power reserve of the mechanical horological movement 1 comprise a control element 3, which may be a control wheel as shown in this first embodiment, or also a control plate movable in a rectilinear direction. The control wheel 3 is disposed opposite the cage of the barrel system 2, and can be arranged to rotate about an axis of rotation 23 parallel to the central axis 16 of the barrel system 2. A complementary member 8 in the shape of a complementary wheel 8 in this case drives the control wheel 3 in a direction of charge or discharge of the barrel system 2, in particular at the output of a differential.

In this embodiment, the control wheel 3 comprises an aperture 13 as a control portion, said aperture 13 having a first end 21 to define a complete charge of the barrel system 2 and a second end 22 to define a complete discharge of the barrel system 2 for indicating the power reserve at zero. The aperture 13 is circular-arc shaped with a determined angle and centred on the axis 23 of the control wheel 3 while being parallel to the central axis or shaft 16 of the barrel system 2. The first end 21 of the aperture 13 and second end 22 of the aperture 13 have the shape of circular portions. These circular portions at both ends define half of a circle with a radius corresponding to half the width of the aperture 13.

The means 10 for detecting the power reserve of the mechanical horological movement 1 also comprise a lever 4, which can preferably be mounted to rotate about a lever axis 14 parallel to the axis of rotation 23 of the control wheel 3 and/or parallel to the central axis 16 of the barrel system 2. The lever 4 comprises a contact element 5 disposed in the aperture 13 of the control element 3, which is the control wheel 3 in this first embodiment, to contact the second end 22 of the aperture 13 during a zero power reserve indication. The lever 4 is pushed in rotation about its lever axis 14 by the second end 22 so that a blocking part 15 of the lever 4 contacts the cage of the barrel system 2 is preferably in contact with an edge 12 of the cage of the barrel system 2. The axis of rotation 14 of the lever is disposed near the blocking part 15 which may be a wedge or a stud fixed under a surface of the lever 4 or directly made integrally with the lever 4 in general. The wedge or the stud does not normally comprise any rib on its periphery so as to bear only against the edge 12 of the barrel system 2 in order to block the movement by friction.

In one embodiment not shown, the lever 4 can be movable in rotation or in a rectilinear manner. The lever 4 can comprise a contact element 5, which is disposed opposite a control portion 13 of the control element 3 or in a control portion 13 of the control element 3. The control element 3 may be a wheel with a control portion in the shape of a cam with a blocking member on the cam defining a power reserve at zero. The contact element 5 in the shape of a feeler or a wedge directly contacts the blocking member when the power reserve is at zero to block the movement by the blocking part 15 of the lever 4.

The first drive wheel arrangement also comprises a second wheel 7' mounted coaxially on the axis of the complementary member 8 in the shape of a wheel, and a first wheel 7 for rotating the second wheel 7', said first wheel 7 being fixed on the cage of the barrel system 2 at the central axis 16 of the barrel system 2. Preferably, the first wheel 7 is traversed by the central axis or shaft 16 of the barrel system 2. The two wheels 7, 7' and the complementary wheel 8 are toothed wheels to allow at least the first wheel 7 to drive said second wheel 7' by meshing. The contact between the second wheel 7' and the complementary wheel 8, as well as the contact between the third wheel 6" and the complementary wheel 8 passes through balls. There is a differential effect between the second wheel 7' and the third wheel 6" by sandwich contact of said balls. The complementary toothed wheel 8 meshes with the control wheel 3, which comprises toothing at the periphery.

The second drive wheel 6, 6', 6" arrangement for the charge of the barrel system 2 comprises a first wheel 6 directly connected to the central axis or shaft 16 of the barrel system 2. This first toothed wheel 6 meshes with a second toothed wheel 6' disposed in the same plane as the first wheel 6 and rotating about an axis of rotation 18. This second toothed wheel 6' is also provided to mesh with a third wheel 6" disposed between the complementary wheel 8 and the second wheel 7' of the first drive wheel arrangement and in a coaxial manner.

Depending on the rotation of the third wheel 6" of the second arrangement and the second wheel 7' of the first arrangement, the complementary wheel 8 will rotate in either direction.

It should be noted that the wheel arrangements described above allow to connect the charging and discharging of the barrel system 2, as an energy reservoir, to the display of the power reserve indication. The second drive wheel 6, 6', 6" arrangement transmits the charge of the barrel system 2 (winding) with a good transmission ratio, while the first drive wheel 7, 7' arrangement transmits the discharge of the barrel system 2 (normal discharge during operation) with the good transmission ratio. The differential is designed to average these two pieces of information and transmit them to the display.

It should also be noted that the first end 21 of the aperture 13 corresponding to the complete charge of the barrel system 2 contacts either the contact element 5 of the lever 4 or in this case a portion connected to the central axis 16 of the barrel system 2.

Figure 2A:
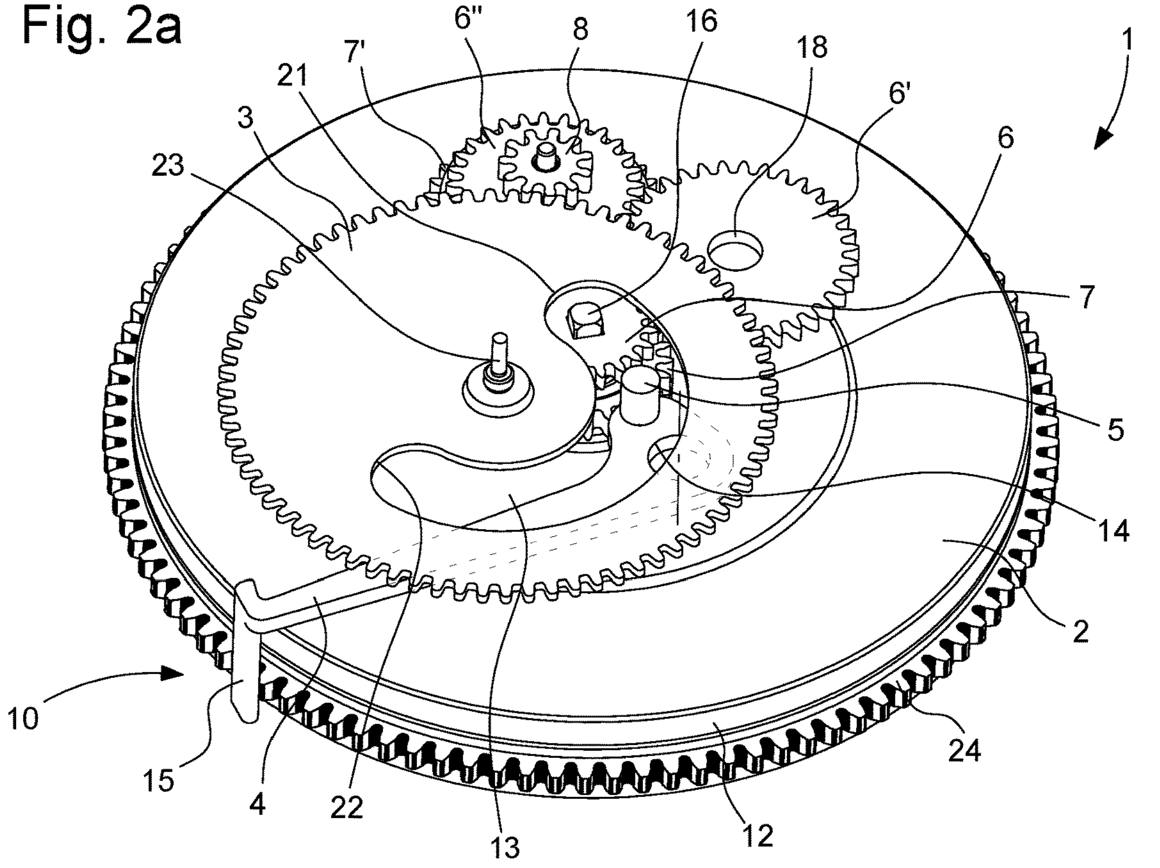
FIGS. 2*a*, 2*b* and 2*c* show two three-dimensional top views and a top view of the position shown in FIG. 2*b* of a second simplified embodiment of the mechanical horological movement provided with power reserve detection means according to the invention.
Figure 2B:
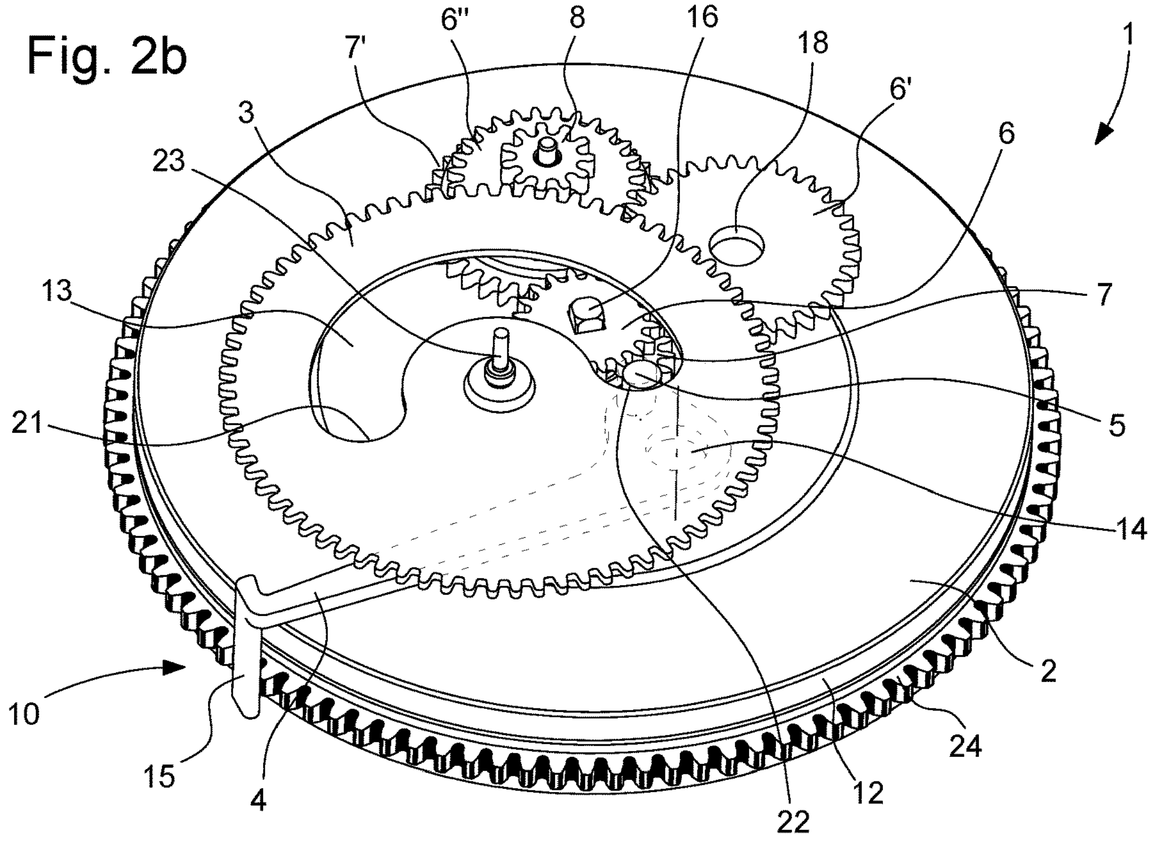
Figure 2C:
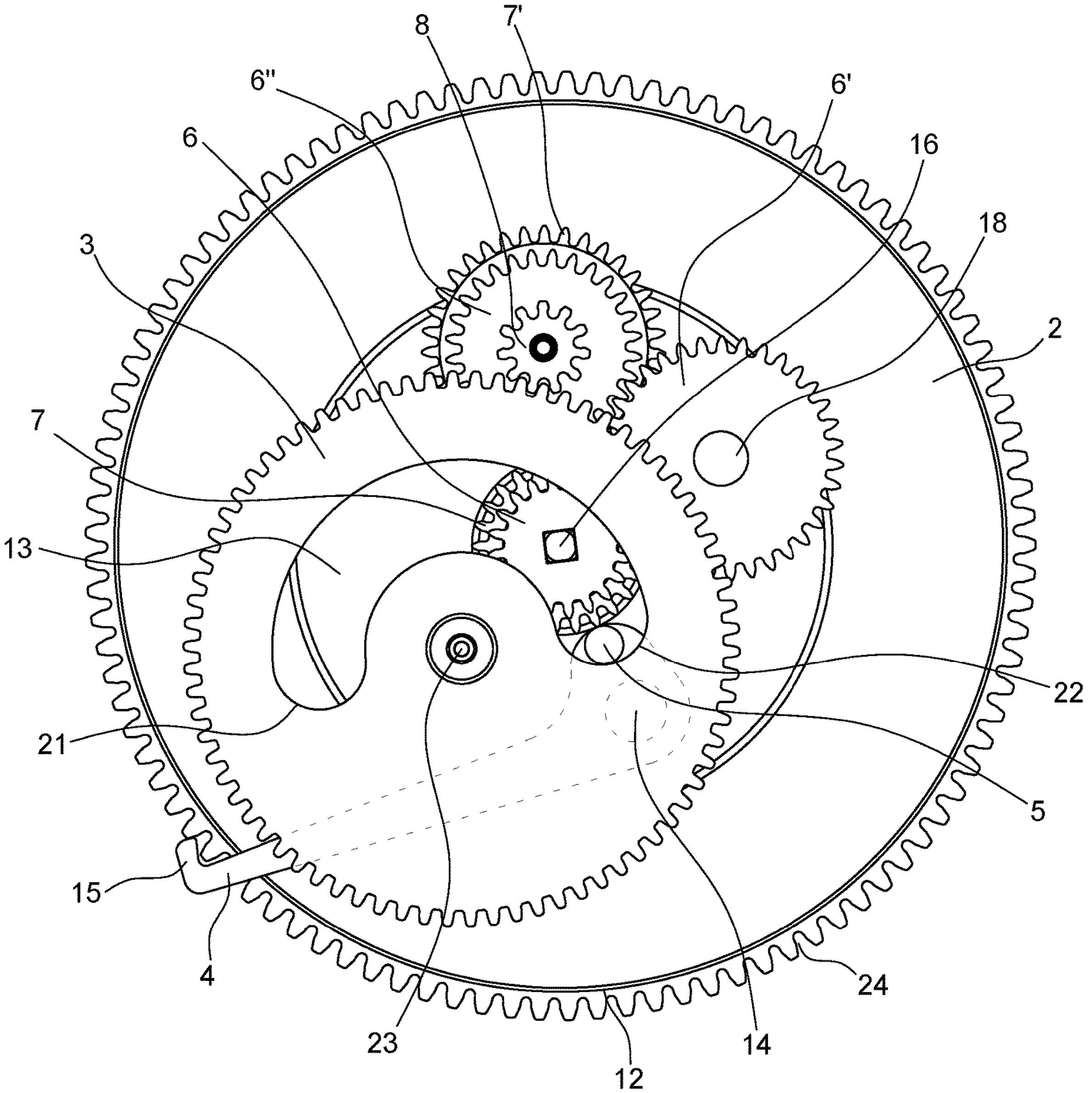

FIGS. 2*a*, 2*b* and 2*c* show two three-dimensional top views and a top view of the position shown in FIG. 2*b* of a second simplified embodiment of the mechanical horological movement provided with power reserve detection means according to the invention.

In this second embodiment which comprises components similar to what has been described with reference to FIGS. 1*a*, 1*b* and 1*c*. Under these conditions, the entire description of these components will not be repeated. It only refers to the different components.

In this second embodiment, the essential difference is at the blocking part 15 of the lever 4 which is a tooth capable of coming into the teeth of a peripheral toothed wheel 24 of the cage of the barrel system 2 since the power reserve is at zero to block movement.

Figure 3A:
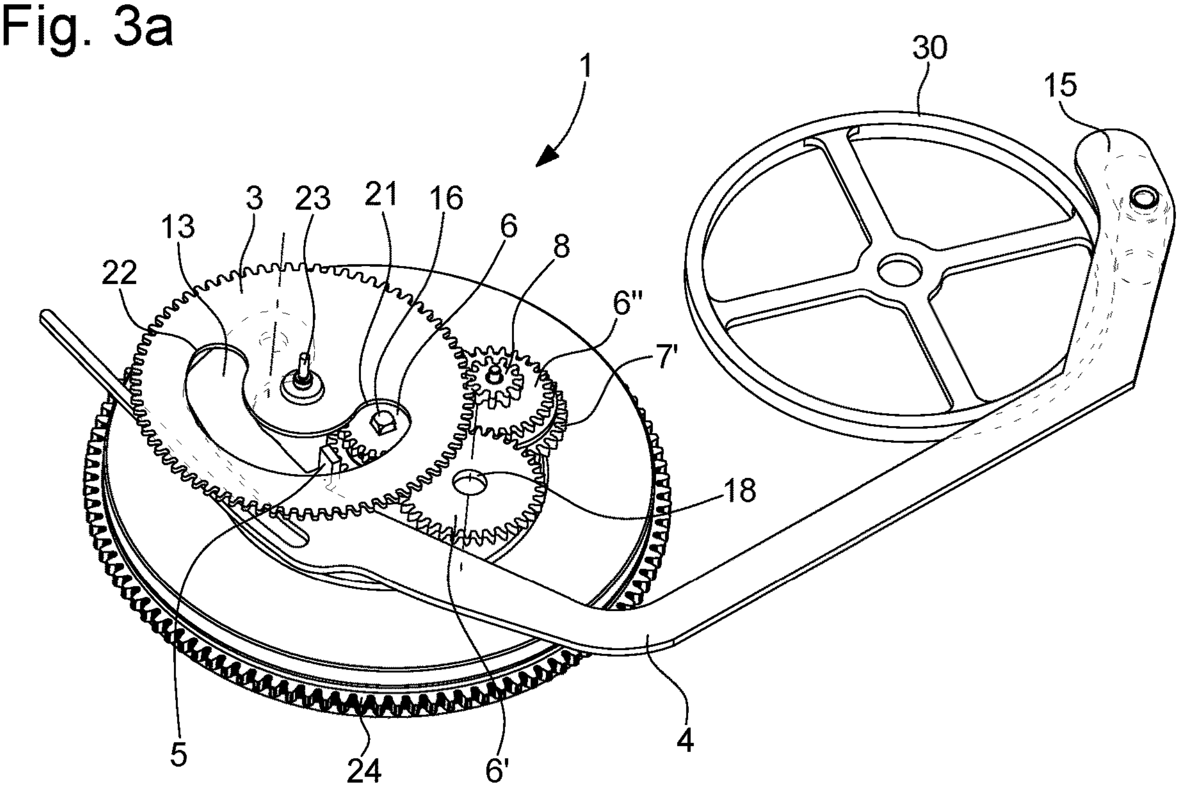
FIGS. 3*a*, 3*b* and 3*c* show two three-dimensional top views and a top view of the position shown in FIG. 3*b* of a third simplified embodiment of the mechanical horological movement provided with power reserve detection means according to the invention.
Figure 3B:
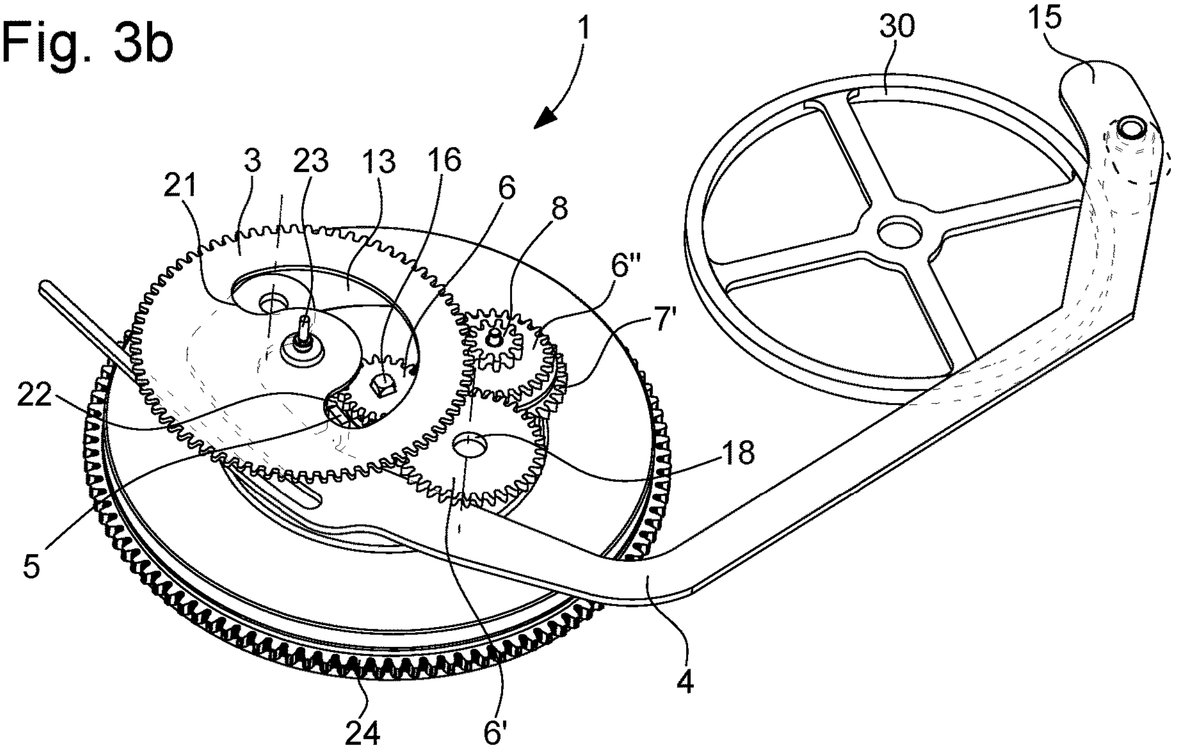
Figure 3C:
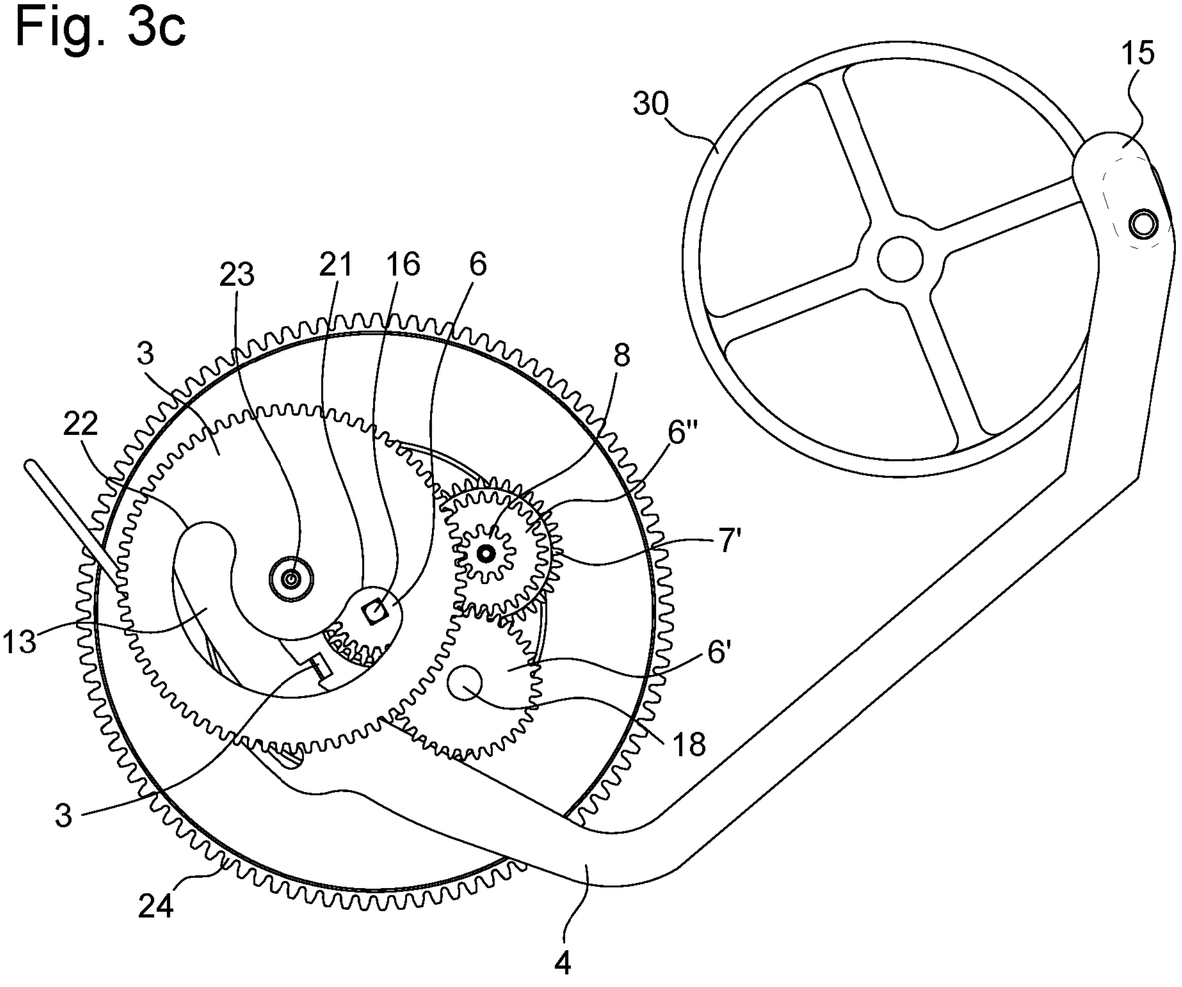

The third embodiment shown in FIGS. 3*a*, 3*b* and 3*c* differ from the other two embodiments, because it is not a blocking at the cage of the barrel system which takes place when the power reserve is at zero, but a blocking of a rim 30 of a mechanical oscillator. However, the blocking of the movement takes place in the same way as the embodiments described above by the blocking part 15 in contact with the rim 30. The entire description of these elements will therefore not be repeated.

The various components described above can be in other shapes while guaranteeing direct blocking of the movement when the power reserve is at zero.

From the description which has just been given, several variant embodiments of the mechanical horological movement with power reserve detection means can be designed by the person skilled in the art without departing from the scope of the invention defined by the claims.

What is claimed is:

1. A mechanical horological movement provided with means for detecting the power reserve for a watch, the movement comprising at least one barrel system with at least a first drive wheel arrangement connected at the output of the central axis of the barrel system and a second drive wheel arrangement connected to a cage of the barrel system at the axis, the power reserve detection means comprising a control element disposed opposite the cage of the barrel system, and intended to rotate about an axis of rotation parallel to the central axis of the barrel system, or to move in a rectilinear direction, being driven by a complementary member at the output of a differential, and a lever comprising a contact element, which is disposed opposite a control portion of the control element or in a control portion of the control element, and to move the lever so that a blocking part of the lever contacts an element of a geartrain, whether it is directly or indirectly connected to a finishing geartrain or to an oscillator of the movement to directly stop the mechanical horological movement when the power reserve detection means indicates zero, wherein the control element comprises an aperture as the control portion, the aperture having a first end to define a complete charge of the barrel system and a second end to define a complete discharge of the barrel system for indicating the power reserve at zero, and the lever rotatably mounted about a lever axis parallel to the axis of rotation or parallel to the central axis of the barrel system, the lever comprising the contact element disposed in the aperture of the control element to contact the second end of the aperture when the power reserve detection means indicates zero.

2. The mechanical horological movement according to claim 1, wherein the control element is a control wheel, and wherein the aperture is a circular-arc shaped aperture with a determined angle and centred on the axis of the control wheel.

3. The mechanical horological movement according to claim 2, wherein the contact element of the lever is a pin, a rod or a blade disposed through the aperture.

4. The mechanical horological movement according to claim 2, wherein the first end of the aperture and the second end of the aperture have the shape of circular portions.

5. The mechanical horological movement according to claim 4, wherein the circular portions at the ends define half of a circle with a radius corresponding to half the width of the aperture.

6. The mechanical horological movement according to claim 1, wherein the blocking part is intended to contact an edge of the cage of the barrel system, when the power reserve is at zero, to block the movement.

7. The mechanical horological movement according to claim 1, wherein the blocking part comprises a tooth at an end opposite to an axis of rotation of the lever to be housed in teeth of a peripheral toothed wheel of the cage of the barrel system when the power reserve is at zero, to block the movement.

8. The mechanical horological movement according to claim 1, wherein the blocking part comprises a rod or a stud of the lever to contact a rim of a mechanical oscillator in order to block the movement, when the power reserve is at zero.

9. The mechanical horological movement according to claim 1, wherein the movement comprises the first drive wheel arrangement connected to a discharge outlet of a differential barrel system, and the second drive wheel arrangement connected to the discharge output of the differential barrel system, wherein a first drive wheel of the first drive wheel arrangement is fixed to the cage of the barrel system, while a first drive wheel of the second drive wheel arrangement is connected directly to the central axis of the barrel system, and wherein the discharge output of the differential barrel system rotates the control element, which is a control wheel.

10. The mechanical horological movement according to claim 9, wherein the complementary member at the discharge output of the differential barrel system is a complementary toothed wheel to mesh with the control wheel, which is toothed.

11. The mechanical horological movement according to claim 1, wherein the lever can be movable in rotation or in a rectilinear manner, wherein the lever comprises a contact element, which is disposed opposite a control portion of the control element or in a control portion of the control element, which is a wheel with a control portion in a shape of a cam with a blocking member on the cam defining a power reserve at zero, and wherein the contact element in a shape of a feeler or a wedge directly contacts the blocking member when the power reserve is at zero to block the movement by the blocking part of the lever.

* * * * *